(12) United States Patent
Gauss et al.

(10) Patent No.: US 8,176,704 B2
(45) Date of Patent: May 15, 2012

(54) PROCESS AND DEVICE FOR STICKING EDGING MATERIAL ONTO LIGHTWEIGHT BUILDING BOARDS

(75) Inventors: Achim Gauss, Dornstetten/Hallwangen (DE); Peter Rathgeber, Dornstetten (DE); Johannes Schmid, Starzach/Wachendorf (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 345 days.

(21) Appl. No.: 12/037,463

(22) Filed: Feb. 26, 2008

(65) Prior Publication Data
US 2008/0201938 A1 Aug. 28, 2008

(30) Foreign Application Priority Data

Feb. 26, 2007 (EP) .................... 07003880
Dec. 4, 2007 (EP) .................... 07023443

(51) Int. Cl.
*E04C 2/26* (2006.01)
*B32B 5/18* (2006.01)
(52) U.S. Cl. ............... 52/717.05; 52/745.19; 52/745.21; 52/796.1; 156/196; 29/897.32
(58) Field of Classification Search ............ 52/717.05, 52/745.19, 745.21, 782.2, 796.1, 796.12, 52/799.1, 800.1, 802.1, 794.1, 793.1, 800.11, 52/800.12, 800.13, 800.14, 800.15, 800.16, 52/800.17, 800.18, 801.1, 801.11, 802.11; 428/192, 60; 156/196, 209, 220, 221, 71, 156/293, 303.1; 29/505, 525.13, 897.3, 897.32
See application file for complete search history.

(56) References Cited

U.S. PATENT DOCUMENTS

| | | | |
|---|---|---|---|
| 1,492,588 A | | 5/1924 | Utzman |
| 2,825,674 A | * | 3/1958 | Werner .................. 156/182 |
| 3,068,565 A | * | 12/1962 | King et al. .................. 228/181 |
| 3,310,917 A | * | 3/1967 | Simon .................. 52/91.1 |
| 3,319,814 A | | 5/1967 | Van Elten |
| 4,265,688 A | * | 5/1981 | Gorski .................. 156/73.1 |

(Continued)

FOREIGN PATENT DOCUMENTS

DE 33 28 354 A1 2/1985

(Continued)

OTHER PUBLICATIONS espacenet Bibligraphic Data and Abstract EP1563970 (1page); espacenet Description of EP1563970 machine translation (2 pages): http://worldwide.espacenet.com.*

(Continued)

*Primary Examiner* — Brian Glessner
*Assistant Examiner* — Joseph J Sadlon
(74) *Attorney, Agent, or Firm* — Baker Botts LLP (57) ABSTRACT

The invention relates to a process for sticking edging material (12, 10) onto lightweight building boards (1) comprising two thin-walled outer layers (2, 4) and a core layer (6) of lightweight filler material disposed between the outer layers, having the steps: provision of a lightweight building board (1), a decor edge (10) and a stabilizing edge (12), and sticking on of the decor edge (10) and/or the stabilizing edge (12) in the region of a narrow surface (1') of the lightweight building board (1). The process according to the invention is characterized in that the stabilizing edge (12) is introduced into a section between two outer layers (2, 4) in the region of the narrow surface (1') without having first created a recess of at least one outer layer and/or of the core layer in this section, said recess corresponding substantially to the stabilizing edge.

20 Claims, 4 Drawing Sheets

U.S. PATENT DOCUMENTS

| | | | | |
|---|---|---|---|---|
| 4,284,443 | A | * | 8/1981 | Hilton ................................ 156/60 |
| 4,378,405 | A | | 3/1983 | Pilgrim |
| 4,663,912 | A | * | 5/1987 | Vinther .......................... 52/797.1 |
| 4,722,146 | A | * | 2/1988 | Kemeny .......................... 40/605 |
| 4,750,302 | A | * | 6/1988 | Bechtold ............................. 52/72 |
| 4,765,105 | A | * | 8/1988 | Tissington et al. .......... 52/309.11 |
| 4,917,747 | A | * | 4/1990 | Chin et al. ...................... 156/198 |
| 4,931,031 | A | | 6/1990 | Lisiecki |
| 4,967,530 | A | * | 11/1990 | Clunn .......................... 52/506.08 |
| 5,139,845 | A | * | 8/1992 | Beckerman et al. ........... 428/117 |
| 5,192,598 | A | | 3/1993 | Forte et al. |
| 5,281,456 | A | | 1/1994 | Botsolas |
| 5,445,380 | A | | 8/1995 | Polsky |
| 5,470,416 | A | * | 11/1995 | Herring et al. .................. 156/196 |
| 5,700,586 | A | | 12/1997 | Laiho et al. |
| 5,779,182 | A | | 7/1998 | Raudaskoski |
| 5,849,131 | A | | 12/1998 | Shaffer et al. |
| 5,885,685 | A | | 3/1999 | Tingley |
| 6,221,521 | B1 | | 4/2001 | Lynn et al. |
| 6,308,491 | B1 | * | 10/2001 | Porter ............................ 52/794.1 |
| 6,405,509 | B1 | * | 6/2002 | Razl ............................ 52/800.12 |
| 6,524,679 | B2 | | 2/2003 | Hauber et al. |
| 6,777,063 | B2 | | 8/2004 | Born |
| 6,854,230 | B2 | * | 2/2005 | Starke ............................ 52/481.1 |
| 6,941,720 | B2 | | 9/2005 | DeFord et al. |
| 7,254,894 | B1 | | 8/2007 | Halpert |
| 7,658,810 | B2 | * | 2/2010 | Endres et al. .................. 156/210 |
| 7,892,631 | B2 | * | 2/2011 | Bauer ............................ 428/218 |
| 2002/0022560 | A1 | | 2/2002 | Zoeckler et al. |
| 2002/0071937 | A1 | | 6/2002 | Smith et al. |
| 2002/0090871 | A1 | | 7/2002 | Ritchie et al. |
| 2003/0163972 | A1 | | 9/2003 | Angemendt et al. |
| 2004/0187314 | A1 | | 9/2004 | Johnson |
| 2005/0183358 | A1 | * | 8/2005 | Palmersten ...................... 52/268 |
| 2008/0201938 | A1 | * | 8/2008 | Gauss et al. .................... 29/700 |

FOREIGN PATENT DOCUMENTS

| | | | |
|---|---|---|---|
| DE | 102006022313 | * | 11/2007 |
| EP | 0 580 067 | A1 | 1/1994 |
| EP | 1 186 398 | A | 3/2002 |
| EP | 1 563 970 | A1 | 8/2005 |
| EP | 1563970 | A1 * | 8/2005 |
| EP | 1 640 128 | A | 3/2006 |
| EP | 1640128 | | 3/2006 |
| WO | WO 9426992 | A1 * | 11/1994 |
| WO | WO 2007131904 | A1 * | 11/2007 |

OTHER PUBLICATIONS

EP Search Report for Appln No. 07003880.7-2302 Homag Holzbearbeitungssysteme.

U.S. Appl. No. 12/037,451, filed Feb. 26, 2008.

U.S. Appl. No. 12/037,451, Non-final rejection—Jul. 13, 2009.

U.S. Appl. No. 12/037,451 Response to Non-Final Office Action dated Nov. 12, 2009.

U.S. Appl. No. 12/037,451 Non-Final Office Action dated Mar. 23, 2010.

U.S. Appl. No. 12/037,451 Response to Non-Final Office Action dated Jun. 23, 2010.

* cited by examiner

PROCESS AND DEVICE FOR STICKING EDGING MATERIAL ONTO LIGHTWEIGHT BUILDING BOARDS

CROSS-REFERENCE TO RELATED APPLICATIONS

The present application claims the benefit of EP Application No. 07 003 880.7, filed Feb. 26, 2007, and EP 07 023 443.0 filed Dec. 4, 2007, both of which are hereby incorporated by reference in their entirety.

FIELD OF THE INVENTION

The invention relates to a process for sticking edging material onto lightweight building boards comprising two thin-walled outer layers and a core layer of lightweight filler material disposed between said outer layers according to the preamble of claim 1.

PRIOR ART

Lightweight building boards of the type discussed here have a broad range of applications, for the production of doors for example, but also increasingly for the production of table tops or other furniture components.

A process of the type referred to above is disclosed, for example, in EP-A-1640128. With this process, a lightweight building board is first formatted (made into the desired raw shape). Subsequently, a recess is milled in the region of the lightweight building board's narrow side, namely into both the outer layers and also into the core layer. Finally, a stabilising edge, which is provided with or which is still to be provided with a decor edge, is glued into the recess. Although the method has proven itself in practice, it is relatively complicated. Furthermore, the process requires accurate matching of the dimensions of the recess to the dimensions of the stabilising edge and measures for ensuring even gluing between stabilising edge and outer layers.

PRESENTATION OF THE INVENTION

The object of the invention is, therefore, to provide a generic process that enables a simplified process sequence and a good adhesive bond between stabilising edge and outer layers.

This object is achieved according to the invention by a process according to claim 1. Particularly preferred developments of the invention are specified in the dependent claims.

The invention is based on the concept that the filler material of the lightweight building board can be used advantageously as embedding and flexible support for the stabilising edge. Against this background, it is provided according to the invention that in a generic process the stabilising edge is introduced into a section between two outer layers in the region of the lightweight building board's narrow surface without having first created a recess of at least one outer layer and/or of the core layer in this section, said recess corresponding substantially to the stabilising edge. In this way it is possible to dispense with the milling out of a recess in the core and outer layers that is necessary in the prior art, which dramatically simplifies the process sequence and also the design of a machine used therefor. The result of this is also an accelerated process sequence.

Moreover, the stabilising edge is embedded flexibly into the core layer resulting in a counterforce that is sufficient to glue the decor edge to the stabilising edge. Due to this gluing (or other adhesive joint) between decor edge and stabilising edge, the lightweight building board is also provided with a stability in the region of the narrow edge which is sufficient for most application cases. Against this background, it is provided according to a further development of the invention that the core layer is deformed at least in sections when the stabilising edge is introduced, and in fact preferably by an amount of deformation corresponding to the thickness of the stabilising edge.

Although, within the scope of the invention, the stabilising edge and the decor edge may also be provided as a one-piece strip material (i.e. as integrated stabilising and decor edge), it has proven advantageous according to a further development of the invention to provide the stabilising edge and decor edge separately. As a result of this, it is necessary where there are changes in decor edges (decors) to stock considerably less edging material overall as the same stabilising edge may be used for all decors and thus only one stock of stabilising edge is necessary.

According to a further development of the invention, it is provided that where stabilising edge and decor edge are provided separately, they will be joined together, in particular will be glued together, immediately prior to and/or during introduction of the stabilising edge into the section between two outer layers. This gives rise to a particularly continuous process sequence and the elastic restoring force of the core layer arising on introduction of the stabilising edge may be used as a counterpressure force when joining the stabilising edge and decor edge such that there is no necessity for any separate counterpressure elements or the like. Moreover, stabilising and decor edge may be applied in one work step (for example in one revolution around the workpiece) such that the number of process steps is reduced.

Alternatively, it is provided according to a further development of the invention that the decor edge is only joined, particularly is only glued, to the stabilising edge once the stabilising edge has been introduced into the section between two outer layers. As a result of this, it is possible to position the stabilising edge particularly precisely in the section between two outer layers and, if necessary, it is possible for the decor edge desired in each case to only be selected at a very late date which is in particular advantageous when producing small series or individual items.

In order to achieve efficient and durable joining of the stabilising edge and decor edge in addition to secure attachment of the same to the lightweight building board, it is provided according to a further development of the invention that the decor edge is made adhesive on the side facing towards the narrow surface, in particular it is provided with a bonding agent or an existing bonding agent is activated, and that the decor edge is pressed with the adhesive side onto the stabilising edge and the outer layers.

In this regard, the most diverse bonding agents may be used within the scope of the present invention and different bonding agents may also be combined with each other. Thus, according to a further development of the invention, it has proven advantageous in respect of good sealing and durability of the lightweight building board produced for the adhesive side of the decor edge to have at least two regions with different bonding agent properties whereby preferably the regions of the adhesive side assigned to the outer layers comprise a bonding agent which has better moisture-sealing properties than the bonding agent in at least one other region. For example, it is thus possible in the region of the outer layers to use a high-quality, moisture-sealing adhesive whilst in other regions a lower-cost adhesive may be used which merely has to ensure a good adhesive bond.

The stabilising edge may in principle be dimensioned such that it exactly fills the section (clearance) between two outer layers. According to a further development of the invention, however, it is provided that the stabilising edge is introduced into the section between two outer layers such that it is at a distance from at least one outer layer. This results in a simple and trouble-free process that is not impaired by possible dimensional tolerances, particularly of the outer layers. Nevertheless, with regard to adequate stability and rigidity of the lightweight building board, it may be advantageous if, according to a further development of the invention, the surface of at least one outer layer facing the stabilising edge is provided at least in sections with bonding agent, or that alternatively or additionally at least one surface of the stabilising edge facing an outer layer is provided at least in sections with bonding agent.

The stabilising edge may, within the scope of the present invention, consist in principle of any material, for example of wood, plastic or various composite materials. According to a further development of the invention, it has, however, proven particularly advantageous for the stabilising edge to comprise a fiber material, particularly a paperboard material.

For the use envisaged here, this material represents an optimum compromise between adequate strength and rigidity, low-cost availability and ease of processing. In this regard it must be noted that the use of a fiber material, particularly of a paperboard material, as a stabilising edge represents an independent purpose within the scope of the present invention, in fact in combination with the preamble of claim 1 but not necessarily, however, with the characterising portion of claim 1.

As has already been referred to above, it is possible with the process according to the invention to dispense completely with the creation of a recess in the region of the narrow surface. According to a further development of the invention, however, it is provided that at least one recess of at least one outer layer and/or of the core layer will be created in the region of the lightweight building board's narrow surface prior to introduction of the stabilising edge. This recess is characterised, as already defined in claim 1, in that its shape deviates from that of the stabilising edge. By comparison with a matching embodiment of recess and stabilising edge, this makes it possible to achieve improved gluing of the stabilising edge to the lightweight building board. The main reasons to be mentioned for this are improved distribution of the glue and good support of the stabilising edge by the core layer although the present invention is not restricted hereto.

According to a further development of the invention, it is provided that at least one marginal recess is created in at least one transitional region between at least one outer layer and the core layer. This ensures that when a stabilising edge is inserted, there is no destruction of the core layer in the region where the core layer is glued to the relevant outer layer, and that furthermore it is possible for the stabilising edge to be glued well to the relevant outer layer in this transitional region. In this regard it is particularly preferable for the marginal recess to be created in both the core layer and also in the adjacent outer layer such that a clean and defined contact surface for the stabilising edge is created in the region of the relevant outer layer.

The marginal recess may be embodied in a variety of ways within the scope of the present invention. According to a further development of the invention, it is, however, provided that the marginal recess extends deeper into the lightweight building board perpendicular to the narrow side than the stabilising edge inserted thereafter. Thus, even after insertion of the stabilising edge, a clearance remains in the region of the marginal recess which may, for example, serve to accommodate excess glue or may serve as a deformation space for the core layer deformed on insertion of the stabilising edge. In turn this results in clean and error-free gluing of the individual components of the lightweight building board including the stabilising edge.

Alternatively or additionally, according to a further development of the invention, it is provided that at least one marginal recess is formed such that the corresponding outer layer comprises at least one depression in a contact surface for the stabilising edge. Such a depression or such depressions may serve as a glue reservoir into which the glue is applied prior to insertion of the stabilising edge. On insertion of the stabilising edge, its surface is wetted with glue by the glue provided in the depressions such that an even glue joint is produced and thus secure and durable gluing.

In addition, according to a further development of the invention, it is provided that at least one central recess is created in the core layer. As a result of this, it is possible to carefully control the deformation behaviour of the stabilising edge during insertion, for example, by defining the number and design of the central recess(es) as a function of the dimensions, the rigidity, etc. of the stabilising edge or also as a function of the properties of the relevant glue. In this regard it is particularly preferable for the central recess to be shaped like a comb since this results in a particularly homogeneous but nevertheless stable deformation behaviour of the core layer. Furthermore, a comb-like shape contributes towards good distribution of the glue.

Moreover, according to a further development of the invention, it is provided that at least once central recess extends less deeply into the lightweight building board perpendicular to the narrow surface than the stabilising edge inserted thereafter. This ensures that the core layer reliably and consistently retains its embedding effect for the stabilising edge such that the result is good gluing of the stabilising edge in the lightweight building board.

A particularly advantageous device for carrying out the process according to the invention is defined in claim 17. The device according to the invention is characterised in that the processing unit is set up to create a stepped recess in the region of the narrow surface (1') of the lightweight building board (1). As a result it is possible to produce recesses with the most diverse geometries, such as those just described, quickly and reliably in order to achieve secure gluing in this manner.

The embodiment of the processing unit is not particularly restricted such that it may also, for example, be a laser, etc. According to a further development of the device according to the invention, it is, however, provided that the processing unit has a plurality of cutting tools and/or at least one stepped, cutting tool. As a result of this it is possible to achieve a stepped recess particularly quickly and reliably. The stepped cutting tool in question is preferably a stepped milling cutter which may be set up to create the entire recess in a single production step even if this recess has a more complex geometry.

DETAILED DESCRIPTION OF PREFERRED EMBODIMENTS

Preferred embodiments of the present invention will be described in detail in the following with reference to the associated drawings.

First of all, a first embodiment of the process according to the invention will be described with reference to FIG. 1 which shows different processing phases of a lightweight building board 1. Lightweight building board 1 has, in the present embodiment, a top outer layer 2, a bottom outer layer 4 and a core layer 6 of lightweight filler material disposed there between. Although the present invention is not restricted to specific materials, thin-walled outer layers 2, 4 may be formed, for example, by a chipboard whilst core layer 6 may comprise a lightweight filler material, for example a foam, a paper honeycomb material or similar. In this regard, core layer 6 of lightweight filler material generally has a lower density (a lower weight per unit of volume) than respective outer layers 2 and 4.

In step a) of the process, first of all a lightweight building board 1 is provided with a desired format (desired dimensions), for example by cutting lightweight building board 1 out of a large-format lightweight building board.

Subsequently, in step b) using a glue bead, for example, a bonding agent 8, particularly a glue, is applied to the inner surfaces of outer layers 2, 4 in the region of the narrow side of lightweight building board 1.

Then a stabilising edge 12 is supplied (step c), which in the present invention consists of a paperboard strip although of course other materials may also be used. Stabilising edge 12 is introduced into the section between two outer layers 2, 4 in the region of narrow surface 1' of lightweight building board 1, and in fact without first having created a recess of outer layers 2, 4 or of core layer 6 corresponding substantially to the stabilising edge. Thus, during this procedure, core layer 6 is deformed and in fact by an amount of deformation corresponding to the thickness of stabilising edge 12. At the same time during this procedure, the front faces of stabilising edge 12 come into contact with previously applied bonding agent 8 such that the gap present between stabilising edge 12 and outer layers 2, 4 is filled at least in sections with the bonding agent. In this regard it must be noted that the location where the bonding agent is applied may be varied widely within the scope of the invention.

Simultaneously to the introduction of stabilising edge 12 into the section between outer layers 2, 4, a decor edge 10 is supplied which is provided in advance or during feeding with a bonding agent on its side facing towards stabilising edge 12 (step d)). Subsequently, decor edge 10 is placed onto stabilising edge 12 and in the present embodiment this is in fact before the stabilising edge has been introduced completely into the section between outer layers 2, 4. In this regard, decor edge 10 is pressed on, for example, using a contact roll (not shown) in the direction of narrow surface 1' of lightweight building board 1 such that in cooperation with an elastic restoring force of lightweight core layer 6 an adhesive bond is brought about between decor edge 10 and stabilising edge 12.

Figure 1:
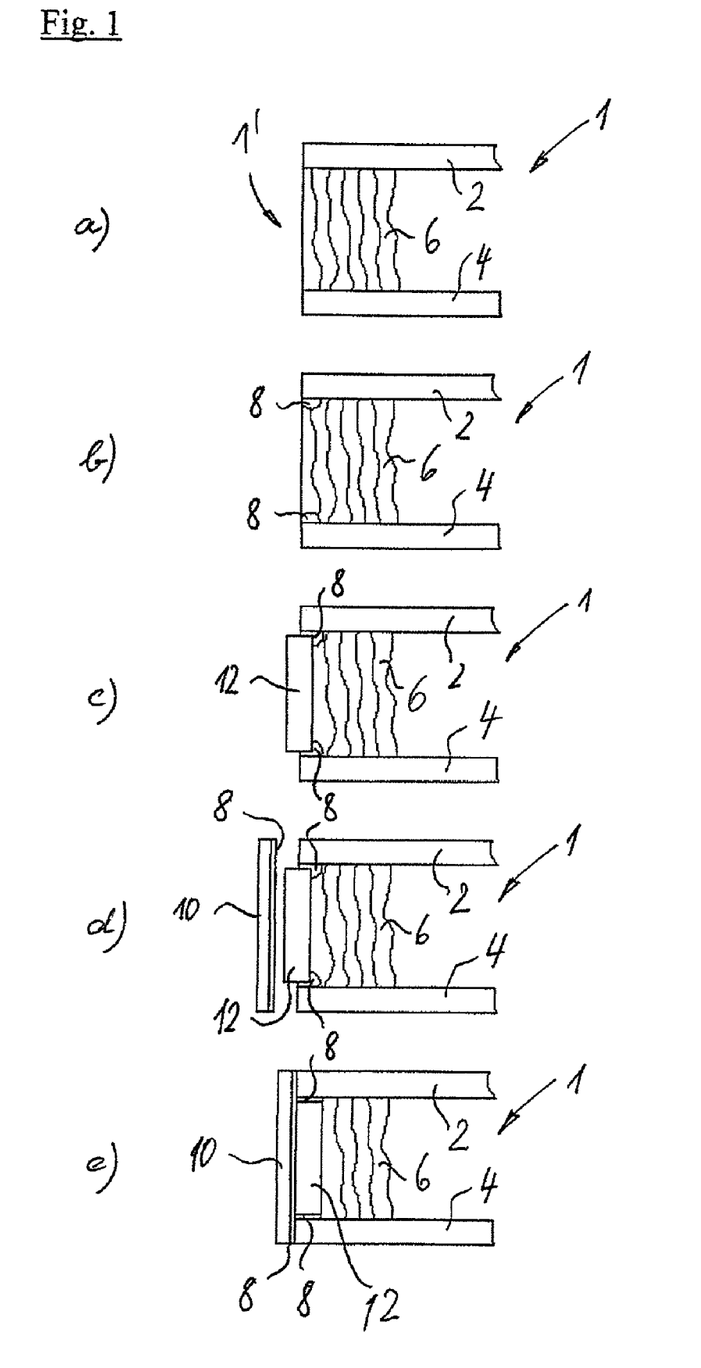
FIG. 1 shows schematically different processing states of a lightweight building board during the execution of a first embodiment of the process according to the invention.

In addition, decor edge 10 is also pressed onto the front faces of outer layers 2, 4 in order to achieve an adhesive bond there as well until finally the state shown in step e) of FIG. 1 is reached. With this the sticking of edging material 10, 12 onto lightweight building board 1 is successfully completed.

Figure 2:
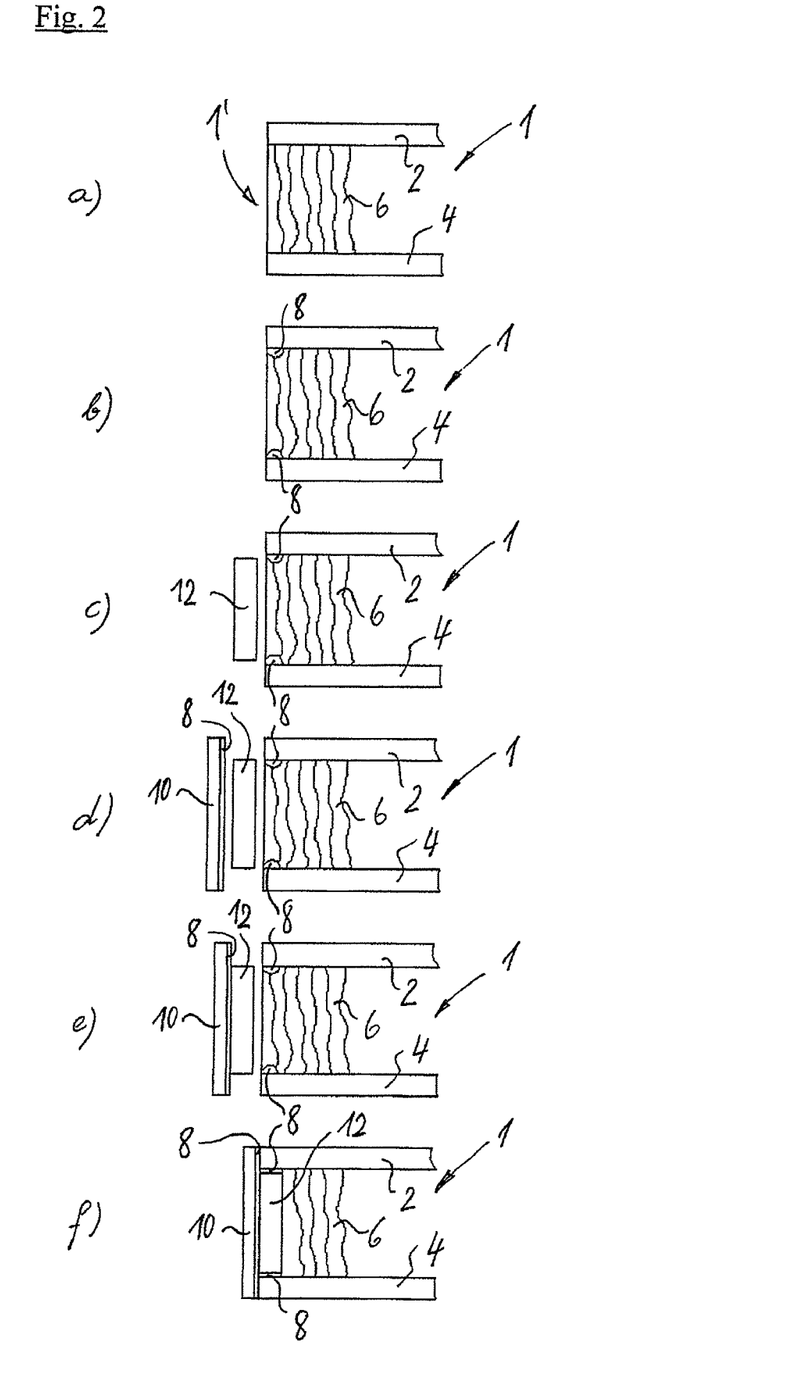
FIG. 2 shows schematically different processing states of a lightweight building board during the execution of a second embodiment of the process according to the invention.

A second preferred embodiment of the process according to the invention is shown schematically in FIG. 2. In this regard, steps a) and b) shown in FIG. 2 correspond to those in FIG. 1.

The embodiment shown in FIG. 2, however, differs essentially from the embodiment shown in FIG. 2 in that stabilising edge 12 and decor edge 10 are already adhesively joined to one another prior to the introduction of stabilising edge 12 into the section between outer layers 2, 4, (step e)), for example by using contact and guide rolls not shown here. Only subsequently is the unit comprising stabilising edge 12 and decor edge 10 applied to narrow surface 1' of lightweight building board 1 such that stabilising edge 12 is introduced into the section between outer layers 2, 4 and decor edge 10 is applied to the front faces of outer layers 2, 4. Introduction of stabilising edge 12 is carried out as in the first embodiment referred to above without first having created in this section a recess of outer layers 2, 4 or of core layer 6 corresponding substantially to the stabilising edge. Accordingly, in this process step there is also a deformation of core layer 6 corresponding to the thickness of stabilising edge 12.

Of course other embodiments are also possible within the scope of the present invention. For example, stabilising edge 12 may also be introduced completely into the section between outer layers 2, 4 (i.e. until it is flush with front face 1' of lightweight building board 1) in order only to apply decor edge 10 adhesively to stabilising edge 12 and to the front faces of outer layers 2, 4 subsequently.

Moreover it should be noted that the process according to the invention may be executed on different types of machines, for example on a continuous operation machine (continuous cycle) or on a stationary machine where the workpiece is disposed in a stationary manner during the process sequence. Of course, mixed forms of both machine types are also possible within the scope of the present invention. In addition, the application of stabilising edge and decor edge may also be carried out using the most diverse devices within the scope of the present invention, for example by means of a single unit or also by means of different units.

Figure 3:
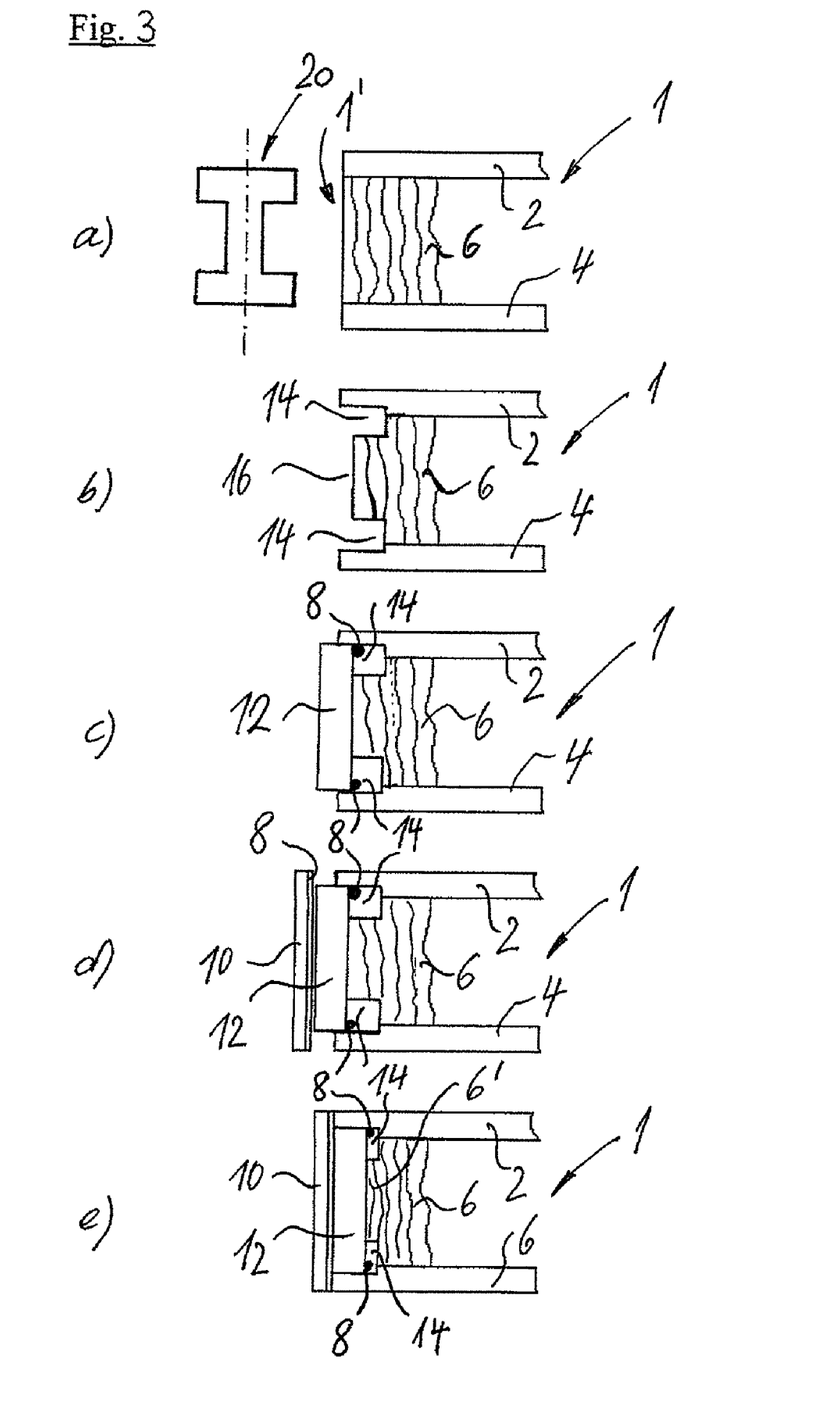
FIG. 3 shows schematically different processing states of a lightweight building board during the execution of a third embodiment of the process according to the invention.

A third preferred embodiment of the process according to the invention is shown schematically in FIG. 3 on the basis of different processing states. This embodiment is also based on the first embodiment which is explained with reference to FIG. 1 whereby corresponding structural elements in both embodiments are referred to by the same reference numerals. In addition, process steps c), d) and e) correspond to those in FIG. 1.

The third embodiment illustrated in FIG. 3 is characterised primarily in that two marginal recesses 14 and a central recess 16 are created in the region of narrow surface 1' prior to the introduction of stabilising edge 12. As illustrated in FIG. 3a), in the present embodiment this is achieved by means of a stepped milling cutter 20 whereby, instead of stepped milling cutter 20, diverse other machining units may also be used, said units being set up to create a stepped recess in the region of narrow surfaces 1' which includes marginal recesses 14 and central recess 16.

As can best be seen in FIG. 3b), marginal recesses 14 are provided in a transitional area between core layer 6 and outer layer 2 and 4 respectively such that they extend into both core layer 6 and also into adjacent outer layer 2 and 4 respectively. In this regard, marginal recesses 14 have a considerably greater penetration depth into the lightweight building board than central recess 16. More accurately expressed, in the present embodiment, marginal recesses 14 extend deeper into the lightweight building board in a direction perpendicular to narrow surface 1' than stabilising edge 12 inserted thereafter which can best be seen on the basis of FIG. 3*e*). In this manner, marginal recesses 14 may reliably serve as glue reservoirs and ensure even and constraint-free distribution of glue 8 applied to stabilising edge 12, outer layers 2, 4 and/or core layer 6 (cf. FIGS. 3(*c*), (*d*) and (*e*).

In contrast, central recess 16 extends less deeply into the lightweight building board in the direction perpendicular to narrow surface 1' than stabilising edge 12 inserted thereafter. In the completed state of lightweight building board 1 according to FIG. 3(*e*), this leads to the formation of a compressed zone 6' in which core layer 6 is compressed locally at least. This results in safe and steady introduction and positioning of the stabilising edge in lightweight building board 1 which is particularly advantageous in conjunction with parallel application of decor edge 10.

Figure 4:
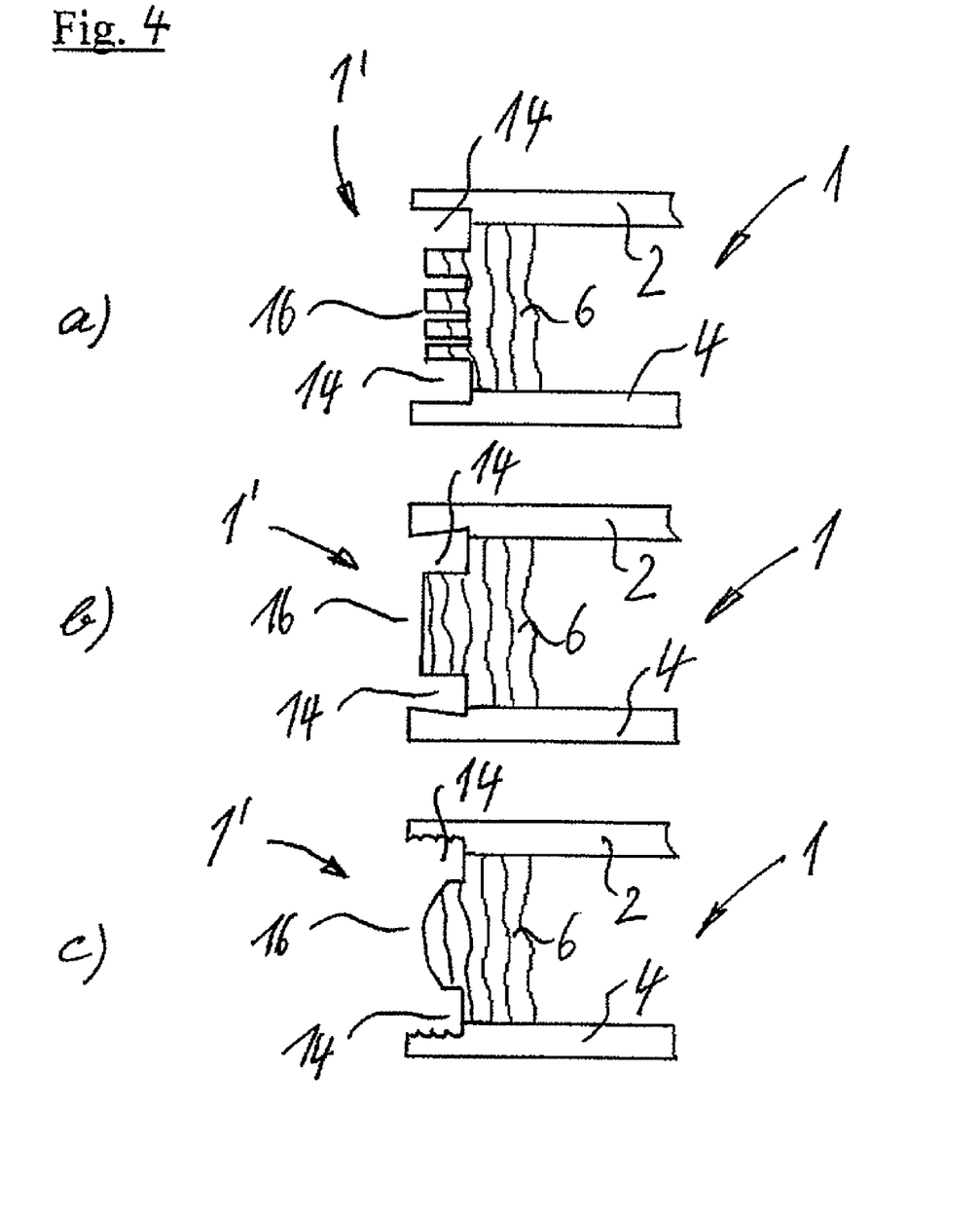
FIG. 4 shows schematically different alternative processing states of the lightweight building board during the execution of the third embodiment shown in FIG. 3.

The disposition and embodiment of marginal recesses 14 and of central recess 16 may be varied diversely within the scope of the present invention, whereby different exemplary embodiments are shown schematically by way of example in FIG. 4. As may be seen in FIG. 4(*a*), central recess 16 may be formed like a comb for example, which improves the spreading behaviour of a glue applied here (not shown) and enables carefully controlled deformation behaviour.

With the embodiment shown in FIG. 4(*b*), marginal recesses 14 taper towards narrow surface 1' such that additional glue distribution spaces arise in the region of the "undercut" which enable a further improved bond between the stabilising edge (not shown) and outer layers 2, 4.

With the embodiment shown in FIG. 4(*c*), central recess 16 has a curved shape and edge recesses 14 are formed such that corresponding outer layer 2 and 4 respectively has a plurality of depressions in a contact surface for stabilising edge 12. These depressions may serve, for example, as glue reservoirs in which the relevant glue (not shown) is introduced prior to introduction of the stabilising edge and which likewise may serve as an equalising space for glue distribution during the insertion process of the relevant stabilising edge.

The invention claimed is:

1. A process for adhering edging material onto a lightweight building board, comprising the steps of:
   (a) providing the lightweight building board, a decor edge and a stabilizing edge, wherein the lightweight building board comprises two thin-walled outer layers, a core layer and a narrow surface;
   (b) introducing the stabilizing edge into the narrow surface of the lightweight building board, wherein introduction of the stabilizing edge deforms the core layer to create at least one recess in the narrow surface of the lightweight building material, and wherein the at least one recess corresponds substantially to the stabilizing edge; and
   (c) adhering the decor edge and/or the stabilizing edge to the narrow surface of the lightweight building board.

2. The process according to claim 1, wherein the core layer is deformed corresponding to the thickness of the stabilizing edge.

3. The process according to claim 2, wherein the stabilizing edge and decor edge are provided separately, and glued together immediately prior to or during introduction of the stabilizing edge into the narrow surface of the lightweight building board.

4. The process according to claim 2, wherein the stabilizing edge and decor edge are provided separately, and the decor edge is glued to the stabilizing edge after introduction of the stabilizing edge into the narrow surface of the lightweight building board.

5. The process according to claim 1, wherein the stabilizing edge and decor edge are provided separately, and are glued together, immediately prior to and/or during introduction of the stabilizing edge into the narrow surface of the lightweight building board.

6. The process according to claim 1, wherein the stabilizing edge and decor edge are provided separately, and the decor edge is glued to the stabilizing edge after introduction of the stabilizing edge into the narrow surface of the lightweight building board.

7. The process according to claim 1, wherein the decor edge is made adhesive on a side facing towards the narrow surface, wherein a bonding agent is provided or an existing bonding agent is activated, and the decor edge is pressed with the adhesive side onto the stabilizing edge and the two thin-walled outer layers.

8. The process according to claim 7, wherein the adhesive side of the decor edge comprises at least two regions with different bonding agent properties whereby the regions of the adhesive side assigned to the two thin-walled outer layers comprise a bonding agent which has better moisture-sealing properties than the bonding agent in at least one other region.

9. The process according to claim 1, wherein the stabilizing edge is introduced into the narrow surface of the lightweight building board such that the stabilizing edge is at a distance from at least one of the two thin-walled outer layers.

10. The process according claim 1, wherein a surface of at least one of the two thin-walled outer layer facing the stabilizing edge comprises at least one section having a bonding agent.

11. The process according to claim 1, wherein at least one surface of the stabilizing edge which faces towards at least one of the two thin-walled outer layers comprises at least one section having a bonding agent.

12. The process according to claim 1, wherein the stabilizing edge comprises a fiber material.

13. The process according to claim 1, wherein the core layer comprises at least one central, comb-shaped recess.

14. The process according to claim 13, wherein the at least one central recess extends less deeply into the lightweight building board in a direction perpendicular to the narrow surface than the stabilizing edge introduced thereafter.

15. The process according to claim 1, wherein, after the adhering, the core layer remains in a deformed state.

16. A process for adhering edging material onto a lightweight building board, comprising the steps of:
   (a) providing the lightweight building board, a decor edge and a stabilizing edge, wherein the lightweight building board comprises two thin-walled outer layers, a core layer and a narrow surface having at least one transitional area between one of the two thin-walled outer layers and the core layer;
   (b) creating at least one recess in the narrow surface of the lightweight building board, wherein the at least one recess corresponds substantially to the stabilizing edge, and wherein the at least one recess comprises at least one marginal recess created in the at least one transitional area;
   (c) introducing the stabilizing edge into the at least one recess in the narrow surface of the lightweight building board, wherein introduction of the stabilizing edge deforms the core layer; and (d) adhering the decor edge and/or the stabilizing edge to the narrow surface of the lightweight building board to maintain the core layer in a deformed state.

17. The process according to claim 16, wherein the at least one marginal recess extends deeper into the lightweight building board in a direction perpendicular to the narrow surface than the stabilizing edge introduced thereafter.

18. The process according to claim 17, wherein the at least one recess further comprises at least one central, comb-shaped recess formed in the core layer.

19. The process according to claim 16, wherein the at least one marginal recess is formed such that the at least one of the two thin-walled outer layers comprises at least one depression in a contact surface for the stabilizing edge.

20. A process for adhering edging material onto a lightweight building board, comprising the steps of:
  (a) providing the lightweight building board, a décor edge, and a stabilizing edge, wherein the lightweight building board comprises two thin-walled outer layers, a core layer, and a narrow surface;
  (b) introducing the stabilizing edge into the narrow surface of the lightweight building board, wherein introduction of the stabilizing edge deforms the core layer by a deformation amount corresponding to a thickness of the stabilizing edge; and
  (c) adhering the decor edge and/or the stabilizing edge to the narrow surface of the lightweight building board.

* * * * *